Patented Sept. 24, 1935

2,015,580

UNITED STATES PATENT OFFICE 2,015,580

1-(PARAHYDROXYPHENYL)-2-DIMETHYL-AMINOPROPANE AND ITS ACID ADDITION SALTS

Gordon A. Alles, Monterey Park, Calif.

No Drawing. Application April 21, 1933,
Serial No. 667,198

4 Claims. (Cl. 260—128)

This invention relates to a new compound. The principal object of the invention is to provide a new compound useful for therapeutic purposes.

The compound of my present invention consists of 1-(parahydroxyphenyl)-2-dimethylaminopropane,

HO—$C_6H_4$—$CH_2$—CH($CH_3$)—N($CH_3$)$_2$, as the free base or in combination with an acid as an addition salt. This 1-(parahydroxyphenyl)-2-dimethylaminopropane and its addition salts are physiologically active and produce effects in animals and man similar to those produced by hordenine and its salts.

In a separate application filed by me of even date herewith, I have described 1-(paramethoxyphenyl)-2-methylaminopropane, as the free base or as an addition salt, and a method of making the same.

The method of making 1-(parahydroxyphenyl)-2-dimethylaminopropane, as the free base or in combination with an acid as an addition salt, preferably comprises the following two steps although it may be produced using other starting materials and processes.

(1) The methylation of the nitrogen atom in 1-(paramethoxyphenyl)-2-methylaminopropane, $CH_3O$—$C_6H_4$—$CH_2$—CH($CH_3$)—$NHCH_3$, to form the dimethyl derivative

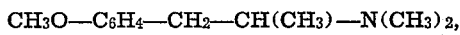

$CH_3O$—$C_6H_4$—$CH_2$—CH($CH_3$)—N($CH_3$)$_2$, and the separation of this in a substantially pure form as the free base or in combination with an acid as an addition salt.

(2) The demethylation of the oxygen atom in the 1-(paramethoxyphenyl)-2-dimethylaminopropane or its salt prepared in step (1), by means of heating in concentrated acid solution, followed by isolation of the desired 1-(parahydroxyphenyl)-2-dimethyylaminopropane as the free base or in combination with an acid as an addition salt.

These two steps can be carried out with good yield in the following manner:

1. One mol of 1-(paramethoxyphenyl)-2-methylaminopropane base is dissolved with two hundred cubic centimeters of methanol and there is slowly added one mol of methyl iodide, using a reflux condenser to prevent loss of methyl iodide by evaporation before reaction takes place. After gently refluxing this mixture on a hot water bath for one hour there is added one hundred cubic centimeters of ten normal aqueous sodium hydroxide solution and one liter of ether. The crystalline 1-(paramethoxyphenyl)-2-trimethylammoniumpropane iodide that is precipitated is filtered off and the ether-methanol filtrate, containing unchanged 1-(paramethoxyphenyl)-2-methylaminopropane and the desired 1-(paramethoxyphenyl)-2-dimethylaminopropane, is washed well with water. The ether extract is then acidified with a half liter of six normal aqueous hydrochloric acid and then a solution of two mols of sodium nitrite in a half liter of water is slowly added. The ether layer is then separated off and the aqueous layer further extracted with ether. The resultant aqueous solution is then made strongly alkaline and the liberated base taken up with fresh ether. This ether solution contains the substantially pure 1-paramethoxyphenyl)-2-dimethylaminopropane, which may be obtained as the free base by distilling off the ether and then distilling the residue under reduced pressure. If a salt is desired it may best be prepared by extracting the ether solution of the base with an aqueous solution of the acid required and evaporation of the water present.

The free base, 1-(paramethoxyphenyl)-2-dimethylaminopropane, distills at 121° C. under a pressure of 15 mm. of mercury. The hydrochloride crystallizes from ethanol without solvent of crystallization and melts when pure at 160–162° C. The hydrobromide crystallizes from the same solvent and melts when pure at 143–145° C.

2. One mol of 1-(paramethoxyphenyl)-2-dimethylaminopropane, as the free base or in combination with an acid as a salt such as the hydrochloride or hydrobromide is dissolved with one liter of constant boiling aqueous hydroiodic acid solution (57%) and the mixture heated to boiling for twenty minutes using a reflux condenser under atmospheric pressure. The water solution of the product, obtained by evaporation of the excess aqueous acid present, addition of water and decolorization with charcoal, is made alkaline with a concentrated aqueous sodium carbonate solution. The desired 1-(parahydroxyphenyl)-2-dimethylaminopropane is precipitated as a gummy material which soon solidifies. This solid can be crystallized from ethanol, alone or with the addition of ether or benzene, or may be directly converted into a salt by combining it with an acid.

The free base is a solid melting at 133–134° C. when pure and is not very soluble in ether or benzene. The salts with the halogen acids, the hydrochloride, hydrobromide or hydroiodide can be made but are not readily crystallizable. Likewise the neutral sulphate can be made, but shows little tendency to crystallize. A phosphate can be obtained in crystalline form from water-alcohol solutions and melts at 210–212° C. Neither the citrate or tartrate are readily crystallizable but can be prepared by mixing molecularly equivalent amounts of the base with the corresponding citric and tartaric acids.

The free base or its salts are suitable for therapeutic purposes alone or in combination with other materials in solution and in liquid and solid mixtures.

I claim:

1. The chemical compounds 1-(parahydroxyphenyl)-2-dimethylaminopropanes of the group consisting of 1-(parahydroxyphenyl)-2-dimethylaminopropane and the acid addition salts of 1-(parahydroxyphenyl)-2-dimethylaminopropane.

2. The chemical compound 1-(parahydroxyphenyl)-2-dimethylaminopropane.

3. The chemical compounds consisting of the acid addition salts of 1-(parahydroxyphenyl)-2-dimethylaminopropane.

4. The chemical compound, the phosphoric acid addition salt of 1-(parahydroxyphenyl)-2-dimethylaminopropane.

GORDON A. ALLES.